United States Patent [19]

Hani et al.

[11] Patent Number: 5,252,123
[45] Date of Patent: Oct. 12, 1993

[54] GEL-FREE PAINT CONTAINING CUPROUS OXIDE PLUS 2,2'-DITHIOBIS (PYRIDINE-1-OXIDE) COMPOUND

[75] Inventors: Rahim Hani, Cheshire; Craig Waldron, Waterbury; Douglas A. Farmer, Jr., Madison, all of Conn.

[73] Assignee: Olin Corporation, Cheshire, Conn.

[21] Appl. No.: 170

[22] Filed: Jan. 4, 1993

Related U.S. Application Data

[63] Continuation-in-part of Ser. No. 938,962, Sep. 1, 1992, Pat. No. 5,185,033.

[51] Int. Cl.⁵ .................................................. C09D 5/14
[52] U.S. Cl. ........................................ 106/18.33; 106/16; 106/18.34; 514/188; 514/345; 514/499; 514/500; 504/121
[58] Field of Search ............... 106/15.05, 16, 18.33, 106/18.34; 504/121; 514/188, 345, 499, 500

[56] References Cited

U.S. PATENT DOCUMENTS

| | | | |
|---|---|---|---|
| 3,615,744 | 10/1971 | Yokoo et al. | 106/15.05 |
| 4,039,312 | 8/1977 | Patru | 106/16 |
| 4,581,351 | 4/1986 | Berke et al. | 514/345 |
| 4,918,147 | 4/1990 | Yamamori et al. | 424/78 |
| 5,057,153 | 10/1991 | Ruggiero | 106/18.33 |
| 5,098,473 | 3/1992 | Hani et al. | 106/18.33 |
| 5,112,397 | 5/1992 | Farmer, Jr. et al. | 106/18.33 |
| 5,137,569 | 8/1992 | Waldron et al. | 106/18.33 |
| 5,185,033 | 2/1993 | Hani et al. | 106/18.33 |

*Primary Examiner*—Mark L. Bell
*Assistant Examiner*—Anthony J. Green
*Attorney, Agent, or Firm*—Dale Lynn Carlson

[57] ABSTRACT

The present invention relates generally to paints and paint bases, and, more specifically to a process for providing a stable gel-free dispersion of biocidal amounts of 2,2'-dithiobis(pyridine-1-oxide) or its metal salt adducts of the formula $(C_5H_4NOS)_2 MY_t$ or their hydrates plus cuprous oxide biocide in paint, where M is an alkaline earth metal, Y is the anion of an organic or inorganic acid, and t is 1 or 2. The resulting paint is storage stable and remains gel-free after several months of storage at room temperature.

21 Claims, No Drawings

GEL-FREE PAINT CONTAINING CUPROUS OXIDE PLUS 2,2'-DITHIOBIS (PYRIDINE-1-OXIDE) COMPOUND

This application is a continuation-in-part application of U.S. Ser. No. 07/938,962 filed on Sep. 1, 1992, now U.S. Pat. No. 5,185,033.

FIELD OF THE INVENTION

The present invention relates generally to paints and paint bases, and, more specifically to a process for providing a stable, gel-free dispersion of biocidal amounts of 2,2'-dithiobis(pyridine-1-oxide), or its metal salt adducts of the formula $(C_5H_4NOS)_2MY_t$ or their hydrates, plus cuprous oxide biocide in Paint, where M is an alkaline earth metal, Y is the anion of an organic or inorganic acid, and t is 1 or 2.

BACKGROUND OF THE INVENTION

Combinations of zinc pyrithione and cuprous oxide are known to be excellent antifouling agents when formulated into paints and paint bases (i.e., the paint before pigment addition) also containing rosin, as disclosed, for example, in U.S. Pat. No. 5,057,153. Unfortunately, however, such paints have now been found to thicken or gel unacceptably within a few days, at best, or a few hours, at worst, when formulated with typical commercial grades of zinc pyrithione in combination with cuprous oxide.

Heretofore, various solutions to the problem of gellation of paints containing rosin and zinc pyrithione in combination with cuprous oxide, have been suggested. Illustrative solutions have been to use rigorously purified zinc pyrithione, as disclosed in U.S. Pat. No. 5,098,473, or to add amines or esterified rosin, as disclosed in U.S. Pat. No. 5,112,397, or to use a metal salt of rosin, as disclosed in U.S. Pat. No. 5,137,569. Since these solutions may have drawbacks such as increased cost or lack of compatibility with some paints, a new, economical solution to the problem would be highly desired by the paint manufacturing community in order to maximize flexibility in using this combination of biocides in view of its excellent biocidal activity.

The present invention provides one solution to this problem. Although individually cuprous oxide, 2,2'-dithiobis(pyridine-1-oxide) (hereinafter also referred to as "bispyrithione"), and its metal salt adducts and their hydrates are all known biocides, the use of a combination of bispyrithione or its metal salt adducts or their hydrates plus cuprous oxide as biocides in the production of a paint which is stable against gellation during storage have not been known heretofore to the knowledge of the present inventors.

SUMMARY OF THE INVENTION

In one aspect, the present invention relates to a process for providing a gel-free paint or paint base characterized by biocidal efficacy. The process comprises adding to a paint or paint base a biocidally effective amount of bispyrithione or its metal salt adducts or their hydrates plus cuprous oxide, or a combination thereof.

The bispyrithione metal salt adducts useful in the present invention have the formula $(C_5H_4NOS)_2MY_t$ wherein M is an alkaline earth metal, Y is the anion of an inorganic or organic acid and t is either 1 or 2. More particularly, the adducts contain an alkaline earth metal (M) selected from the group consisting of calcium, magnesium, barium and strongtium with calcium and magnesium being preferred and the anion (Y) is selected from the group consisting of halides, sulfates, nitrates, chlorates and acetates with the chlorides and sulfates being preferred. More particularly preferred are the adducts of calcium chloride ($CaCl_2$) or magnesium sulfate ($MgSO_4$). Also included in the adducts of this invention are hydrates of the aforementioned compounds, i.e., adducts including $nH_2O$ groups where of 0 to 10. Additionally, the adducts may contain one or more substituents on either or both pyridine ring structures such as alkyls, halogens and alkoxy groups. Reference to the adducts in the specification and claims is intended to include compounds containing such substituents. It is further noted that $(C_5H_4NOS)_2$ as used above and throughout the specification and claims represents bis-(2-pyridyl-1-oxide) disulfide and has the structural formula shown below:

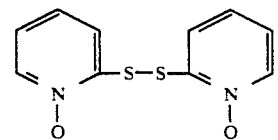

The preparation of the adducts is described in U.S. Pat. No. 3,818,018.

In another aspect, the present invention relates to a paint or paint base composition characterized by enhanced biocidal efficacy and gellation resistance wherein the paint or paint base contains a biocide consisting essentially of bispyrithione or its metal salt adducts or their hydrates and cuprous oxide, or a combination thereof. Preferably, the bispyrithione or its metal salt adducts or their hydrates, or combination thereof, are present in an amount of between about 1% and about 25% (preferably 5–25%, more preferably 10–25%), and the cuprous oxide being present in an amount of between about 20% and about 70%, the total amount of said bispyrithione or its metal salt adducts or their hydrates plus said cuprous oxide being between about 20% and about 80%, based upon the total weight of the paint or paint base.

These and other aspects of the invention will become apparent upon reading the following detailed description of the invention.

DETAILED DESCRIPTION OF THE INVENTION

It has been surprisingly found that the compositions of the present invention are storage stable and do not tend to form gels upon standing. This result is in distinct contrast to the tendency for zinc pyrithione plus cuprous oxide compositions to form gels, as illustrated by the specific examples provided hereinbelow.

Although the improved biocidal efficacy and gellation resistance advantages associated with the present invention are expected to provide advantages when used in a wide variety of paints, including indoor and outdoor household paints, industrial and commercial paints, particularly advantageous results are obtained when the process and composition of the present invention are utilized in conjunction with marine paints for use, for ship's hulls. In addition, the composition and process of the present invention provides highly desirable results in the context of exterior paints of both the latex and alkyd types.

Typically, a paint composition will contain a resin, an organic solvent (such as xylene or methylisobutylketone), a pigment, and various optional additives such as thickening agent(s), wetting agents, and the like, as is well-known in the art. The resin is preferably selected from the group consisting of vinyl, alkyd, epoxy, acrylic, polyurethane and polyester resins, and combinations thereof. The resin is preferably employed in an amount of between about 20% and about 80% based upon the weight of the paint or paint base.

In addition, the paint composition of the present invention optionally additionally contains optional additives which have a favorable influence on the viscosity, the wetting power and the dispersibility, as well as on the stability to freezing and electrolytes and on the foaming properties. The total amount of optional additives is preferably no greater than 20% by weight, more preferably between about 1% and about 5% by weight, based upon the total weight of the paint composition.

Illustrative thickening agents include cellulose derivatives, for example methyl, hydroxyethyl, hydroxypropyl and carboxymethyl cellulose, poly(vinyl alcohol), poly (vinylpyrolidone), poly(ethylene-glycol), salts of poly(acrylic acid) and salts of acrylic acid/acrylamide copolymers.

Suitable wetting and dispersing agents include sodium polyphosphate, aryl or alkyl phosphates, salts of low-molecular-weight poly(acrylic acid), salts of poly(ethane-sulfonic acid), salts of poly (vinylphosphonic acid), salts of poly(maleic acid) and salts of copolymers of maleic acid with ethylene, 1-olefins with 3 to 18 carbon atoms and/or styrene.

In order to increase the stability to freezing and electrolytes there may be added to the paint composition various monomer 1,2-diols, for example glycol, propylene-glycol-(1,2), and butylene-glycol-(1,2) or polymers thereof, or ethoxylated compounds, for example reaction products of ethylene oxide with long-chain alkanols, amines, carboxylic acids, carboxylic acid amides, alkyd phenols, poly(propylene-glycol) or poly(butylene-glycol).

The minimum temperature of film formation (white point) of the paint composition may be reduced by adding solvents, such as ethylene-glycol, butyl-glycol, ethyl-glycol acetate, ethyl-diglycol acetate, butyl-diglycol acetate, benzene or alkylated aromatic hydrocarbons. As defoaming agents there are suitable for example poly(propylene-glycol) and polysiloxanes.

The paint composition of the present invention may be used as a paint for natural or synthetic materials, for example wood, paper, metals, textiles and plastics. It is particularly suitable as an outdoor paint, and is excellent for use as a marine paint.

If a marine paint is being fabricated, the paint preferably contains a swelling agent to cause the paint to gradually "slough off" in its marine environment, thereby causing renewed biocidal efficacy of newly exposed biocide (i.e., the copper pyrithione or pyrithione disulfide plus the cuprous oxide) at the surface of the paint in contact with the water medium of the marine environment. Illustrative swelling agents are naturally-occurring or synthetic clays, such as kaolin, montomorillonite (bentonite), clay mica (muscovite), and chlorite (hectonite), and the like. In addition to clays, other swelling agents, including natural or synthetic polymers, such as that commercially available as POLYMERGEL, have been found to be useful in the compositions of the present invention to provide the desired ablasive "sloughing off" effect. Swelling agents can be used singly or in combination. The total amount of optional additives is preferably no greater than 20% by weight, more preferably between about 1% and about 5% by weight, based upon the total weight of the paint composition.

The invention is further illustrated by the following Examples. Unless otherwise stated, the "parts" and "%" are "parts by weight" and "percent by weight", respectively based upon the weight of the paint or paint base.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

COMPARATIVE EXAMPLE A

Demonstration of Gellation Results in a paint containing Cuprous Oxide Plus Zinc Pyrithione A paint was prepared using the following formulation:

The solvent mixture used was a 1:2:1 mixture of xylene MIBK and carbitol acetate (called mixed solvent).

The zinc pyrithione used was standard commercial grade and assayed 97.8% pure by iodometric titration.

| Material | Parts | % |
| --- | --- | --- |
| VAGH resin (1) | 9.3 | 2.8 |
| DISPERBYK 163 (2) | 5.1 | 1.5 |
| Tributyl Phosphate | 6.45 | 2.0 |
| Cuprous Oxide | 136.5 | 41.4 |
| TITANOX (3) | 7.5 | 2.3 |
| Zinc pyrithione powder | 25.5 | 7.7 |
| Wood Rosin | 6.3 | 1.9 |
| Solvent Mixture | 133.0 | 40.0 |

1) vinyl chloride-vinyl acetate-vinyl alcohol terpolymer, a product of Union Carbide Corporation.
2) a high molecular weight block copolymer, a product of BYK-Chemie.
(3) titanium dioxide, a product of DuPont Company.

The procedure employed for preparing the paint was as follows:

(1) A one pint paint can was charged with 41.93 g of a 22.2% VAGH resin solution in a 2:1 mixture by volume of MIBK and xylene.
(2) A mixture of 5.1 g Disperbyk 163 and 5.1 g mixed solvent was added.
(3) Tributyl phosphate was added to the paint can and mixed with a high speed disperser at 1000 RPM for 10 minutes.
(4) The cuprous oxide, zinc pyrithione, titanox, and 10.8 g carbitol acetate were added to the paint can and mixing was continued at 7000 RPM for 1 hr.
(5) The mixing speed was reduced to 2500 RPM and 35 g of mixed solvent was added.
(6) Once the temperature dropped from 45° C. to below 35° C., a solution of 6.3 g of wood rosin in 50 g of mixed solvent was added to the can and the mixture was mixed for 1.0 hr. at 2500 RPM.

The paint formulation made according to this procedure was of suitable viscosity for application by brush immediately after preparation, but thickened to an unpourable paste after approximately 6 hours.

EXAMPLE 1

Demonstration of Stable Paint Containing Cuprous Oxide and Bispyrithione Magnesium Sulfate Hydrate Adduct A paint was prepared using the following formulation:

| Material | Parts | % |
| --- | --- | --- |
| VAGH Resin (22%) | 3.90 | 2.85 |
| Disperbyk 163 | 2.70 | 1.97 |
| Cuprous Oxide | 75.00 | 54.78 |
| Magnesium Sulfate Hydrate Adduct of BisPyrithione | 6.85 | 5.00 |
| Tricresyl Phosphate | 3.60 | 2.63 |
| Wood Rosin WW | 6.85 | 5.00 |
| Solvent Mixture | 38.00 | 27.76 |
| *60% MIBK/40% XYLENE | | |
| TOTAL | 136.90 | 100.00 |

The Procedure was the same as the above example. The formulation remained gel-free, and continues to remain gel-free, after one month of storage.

What is claimed is:

1. A paint or paint base composition characterized by enhanced biocidal efficacy and gellation resistance wherein the paint or paint base contains a biocide consisting essentially of cuprous oxide and 2,2'-dithiobis(-pyridine-1-oxide) or a metal salt adduct thereof having the empirical formula $(C_5H_4NOS)2$ $MY_t$, or a hydrate of said metal salt adduct, wherein M is an alkaline earth metal selected from the group consisting of calcium, magnesium, barium and strontium, Y is an anion selected from the group consisting of halides, sulfates, nitrates, chlorates and acetates and t is either 1 or 2.

2. The paint or paint base of claim 1 wherein M is calcium or magnesium.

3. The paint or paint base of claim 2 wherein Y is chloride or sulfate.

4. The paint or paint base of claim 3 wherein M is calcium, Y is chloride and t is 2.

5. The paint or paint base of claim 3 wherein M is magnesium, Y is sulfate and t is 1.

6. The paint or paint base of claim 1 wherein the formula is selected from the group consisting of $(C_5H_4NOS)_2CaCl_2$, $(C_5H_4NOS)_2MgSO_4.3H_2O$, $(C_5H_4NOS)_2SrCl_2$, $(C_5H_4NOS)_2$ $SrBr_2$, $(C_5H_4NOS)_2BaBr_2$, $(C_5H_4NOS)_2$ $Ca(NO_3)_2$ and $(C_5H_4NOS)_2Ba(ClO_3)_2$. $18H_2O$.

7. The paint or paint base of claim 1 wherein said 2,2'-dithiobis(pyridine-1-oxide) or a metal salt adduct thereof or a hydrate of said metal salt adduct is in an amount of between about 1% and about 25%, and said cuprous oxide is present in an amount of between about 20% and about 70%, the total amount of said 2,2'-dithiobis(pyridine-1-oxide) or a metal salt adduct thereof or a hydrate of said metal salt adduct plus said cuprous oxide being about 20% and about 80%, based upon the total weight of the paint or paint base.

8. The paint or paint base of claim 1 which additionally contains a resin selected from the group consisting of vinyl, alkyl, epoxy, acrylic, polyurethane and polyester resins, and combinations thereof.

9. The paint or paint base of claim 1 which additionally contains a swelling agent selected from the group consisting of natural and synthetic clay and natural and synthetic polymer swelling agents.

10. The paint or paint base of claim 9 wherein said swelling agent is selected from the group consisting of kaolin, montomorillonite (bentonite), clay mica (muscovite), and chlorite (hectonite), and combinations thereof.

11. A process for providing a gellation-inhibited paint or paint base containing 2,2'-dithiobis (pyridine-1-oxide) or a metal salt adduct thereof or a hydrate of said metal salt adduct and cuprous oxide which comprises the step of adding said 2,2'-dithiobis(pyridine-1-oxide) or a metal salt adduct thereof or a hydrate of said metal salt adduct and also adding cuprous oxide to a paint or paint base to provide a paint or paint base characterized by enhanced biocidal efficacy and resistance to gellation, said 2,2'-dithiobis(pyridine-1-oxide) or a metal salt adduct thereof or a hydrate of said metal salt adduct being present in an amount of between about 1% and about 25%, and said cuprous oxide being present in an amount of between about 20% and about 70%, the total amount of said 2 2'-dithiobis pyridine-1-oxide) or a metal salt adduct thereof or a hydrate of said metal salt adduct plus said cuprous oxide being between about 20% and about 80% based upon the total weight of the paint or paint base.

12. The process of claim 11 wherein said 2,2'-dithiobis(pyridine-1-oxide) has the empirical formula $(C_5H_4NOS)_2$ $MY_t$, wherein M is an alkaline earth metal selected from the consisting of calcium, magnesium, barium an strontium, Y is an anion selected from the group consisting of halides, sulfates, nitrates, chlorates and acetates and t is either 1 or 2.

13. The process of claim 12 wherein M is calcium or magnesium.

14. The process of claim 12 wherein Y is chloride or sulfate.

15. The process of claim 12 wherein M is calcium, Y is chloride and t is 2.

16. The process of claim 12 wherein M is magnesium, Y is sulfate and t is 1.

17. The process of claim 12 wherein the formula is selected from the group consisting of $(C_5H_4NOS)_2CaCl_2$, $(C_5H_4NOS)_2MgSO_4.3H_2O$, $(C_5H_4NOS)_2SrCl_2$, $(C_5H_4NOS)_2$ $SrBr_2$, $(C_5H_4NOS)_2BaBr_2$, $(C_5H_4NOS)_2$ $Ca(NO_3)_2$ and $(C_5H_4NOS)_2Ba(ClO_3)_2$. $18H_2O$.

18. The process of claim 11 wherein the total amount of 2,2'-dithiobis(pyridine-1-oxide) or a metal salt adduct thereof or a hydrate of said metal salt adduct plus said cuprous oxide is present in an amount of between about 20% and about 75% based upon the total weight of the paint or paint base composition.

19. The process of claim 11 wherein said paint or paint base additionally contains a resin selected from the group consisting of vinyl, alkyl, epoxy, acrylic, polyurethane and polyester resins, and combinations thereof.

20. The process of claim 11 wherein said paint or paint base additionally contains a swelling agent selected from the group consisting of natural and synthetic clay and natural and synthetic polymer swelling agents.

21. The process of claim 20 wherein said swelling agent is selected from the group consisting of kaolin, montomorillonite (bentonite), clay mica (muscovite), and chlorite (hectonite), and combinations thereof.

* * * * *